United States Patent
Bowers et al.

(10) Patent No.: US 11,054,904 B2
(45) Date of Patent: Jul. 6, 2021

(54) HAPTIC ACTUATOR USING FORCE MULTIPLYING SPRING AND SMART ALLOY WIRE

(71) Applicant: Microsoft Technology Licensing, LLC, Redmond, WA (US)

(72) Inventors: Scott Douglas Bowers, Woodinville, WA (US); Nelson Lin, San Diego, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 406 days.

(21) Appl. No.: 16/184,666

(22) Filed: Nov. 8, 2018

(65) Prior Publication Data

US 2020/0150764 A1 May 14, 2020

(51) Int. Cl.
*G06F 3/01* (2006.01)
*H02N 2/00* (2006.01)

(52) U.S. Cl.
CPC ............. *G06F 3/016* (2013.01); *H02N 2/002* (2013.01); *H02N 2/006* (2013.01); *H02N 2/009* (2013.01); *H02N 2/0075* (2013.01)

(58) Field of Classification Search
CPC ........ G06F 3/016; H02N 2/002; H02N 2/006; H02N 2/0075; H02N 2/009
See application file for complete search history.

(56) References Cited

U.S. PATENT DOCUMENTS 6,468,158 B1  10/2002 Ootori et al.
10,032,550 B1* 7/2018 Zhang ................... H01F 7/066
10,613,678 B1* 4/2020 Sen ........................ G06F 3/046
2011/0181530 A1* 7/2011 Park ........................ G06F 3/016
                                                        345/173
2014/0191973 A1* 7/2014 Zellers ................... G06F 3/016
                                                        345/168
2017/0284379 A1  10/2017 Krumpelman

FOREIGN PATENT DOCUMENTS

| CN | 102750032 A | 10/2012 |
| CN | 207074429 U | 3/2018 |
| CN | 108196720 A | 6/2018 |
| CN | 207663422 U | 7/2018 |
| EP | 2020804 A1 | 2/2009 |
| JP | H09115379 A | 5/1997 |
| WO | 2012023605 A1 | 2/2012 |

OTHER PUBLICATIONS

"International Search Report and Written Opinion Issued in PCT Application No. PCT/US2019/058990", dated Feb. 13, 2020, 12 Pages.
Hattersley, Lucy, "How does Force Touch work?", Retrieved from https://www.macworld.co.uk/feature/mac/how-does-force-touch-work-3606551/, Apr. 6, 2015, 7 Pages.

* cited by examiner

*Primary Examiner* — Emily P Pham
(74) *Attorney, Agent, or Firm* — Ray Quinney & Nebeker P.C.; Paul N. Taylor

(57) ABSTRACT

A haptic feedback device includes a mechanical ground and a haptic surface. A plurality of connection points is connected to the mechanical ground and a plurality of connection points is connected to the haptic surface. An electroreactive wire extends around the plurality of connection point connected to the mechanical ground and the plurality of connection points connected to the haptic surface.

20 Claims, 4 Drawing Sheets

HAPTIC ACTUATOR USING FORCE MULTIPLYING SPRING AND SMART ALLOY WIRE

CROSS-REFERENCE TO RELATED APPLICATIONS

N/A

BACKGROUND OF THE DISCLOSURE

Modern computing devices can utilize a variety of input devices to allow user input to the computing device. Some input devices are conventionally used while the user is viewing a display or otherwise not viewing the input device. For example, a trackpad or other touch-sensing device is conventionally used while the user views a display screen. Other portions of an electronic device or computing device are also used without a user viewing them. For example, various connection ports in a computing device are conventionally utilized or connected without a user viewing the ports directly such as when the ports are located on the side or rear of the computing device. A haptic or tactile feedback device can provide a non-visual communication to a user during interaction with the input device or other portion of an electronic device and while the user is not viewing the input device or other portion of the electronic device.

Conventional haptic feedback devices include oscillatory motors and restoring springs to move a haptic surface or a portion of the device. Such systems require large amounts of space when modern electronic devices are becoming smaller and smaller. A compact, efficient haptic feedback device may allow haptic communications to be provided in more devices and in more portable devices.

SUMMARY

In some implementations, a haptic feedback device includes a mechanical ground and a haptic surface. A plurality of connection points is connected to the mechanical ground and a plurality of connection points is connected to the haptic surface. A spring wire extends around the plurality of connection point connected to the mechanical ground and the plurality of connection points connected to the haptic surface. An electroreactive wire contracts the plurality of connection points connected to the mechanical ground or the plurality of connection points connected to the haptic surface.

In some implementations, an electronic device includes a housing and a haptic surface. A first channel is connected to the housing with a first plurality of connection points slidably connected to the first channel in a first direction. A second channel is connected to the haptic surface with a second plurality of connection points connected to the haptic surface. A spring wire is connected to the first plurality of connection points and the second plurality of connection points such that a contraction of the spring wire in a first direction displaces the first channel and second channel in a second direction.

In some implementations, an electronic device includes a mechanical ground and a haptic surface. A first channel is connected to the mechanical ground with a first plurality of connection points slidably connected to the first channel in a first direction. A second channel is connected to the haptic surface with a second plurality of connection points connected to the haptic surface. A spring wire is connected to the first plurality of connection points and the second plurality of connection points. An electroreactive wire is connected to the first plurality of connection points or the second plurality of connection points. The electroreactive wire has a first state and a second state. The electroreactive wire is movable between the first state and the second state to move the haptic surface relative to the mechanical ground. An electrical input source is configured to apply an electrical input to the electroreactive wire to move the electroreactive wire from the first state to the second state in less than 25 milliseconds (ms).

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of implementations of the disclosure will be set forth in the description which follows, and in part will be obvious from the description, or may be learned by the practice of such implementations. The features and advantages of such implementations may be realized and obtained by means of the instruments and combinations particularly pointed out in the appended claims. These and other features will become more fully apparent from the following description and appended claims or may be learned by the practice of such implementations as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 3-1 is a top view of a haptic feedback device with an electroreactive wire in a first state;

FIG. 3-2 is a top view of the haptic feedback device of FIG. 3-1 with the electroreactive wire moving toward a second state;

DETAILED DESCRIPTION

This disclosure generally relates to devices, systems, and methods for providing haptic or tactile feedback to a user using an electronic device. More particularly, the present disclosure relates to a compact mechanism for providing a haptic communication in an input device, a connection port, a display, a housing, or other portion of an electronic device, such as a computing device. The haptic communication includes moving a portion of the input device or other part of the electronic device in a small, rapid movement. The small, rapid movement may provide a haptic communication to a user that indicates movement but lacks a discernable direction of the movement. The user may, therefore, experience the haptic communication without inferring any unintended additional information (e.g., directional or intensity information) from the haptic communication.

A haptic feedback device includes a force-multiplying wire arranged in a series of angled segments. The force-multiplying wire may be coiled between each segment and form a spring wire. When compressed in an x-direction of the wire, the junctions of the angled segments displace in the y-direction. The segments of the spring wire may straddle between two components, such as a haptic surface and a housing, to move the haptic surface relative to the housing.

The force-multiplying wire may be compressed by a motive force. In some implementations, the motive force is an electroreactive wire. The electroreactive wire has a first state and a second state. The electroreactive wire is moveable between the first state and the second state by the application of an electric input to the electroreactive wire. For example, the electroreactive wire may move from the first state to the second state upon application of an electric current to the electroreactive wire and move the haptic surface via contraction of the force-multiplying spring wire. In some implementations, the electroreactive wire can then return to the first state and generate a restorative force to move the haptic surface back upon the removal of the electric current. In other implementations, the spring wire can apply a restorative force to the electroreactive wire and return the electroreactive wire to the first state. The application and removal of electric input to the electroreactive wire thereby allows for small, rapid haptic communications.

Figure 1:
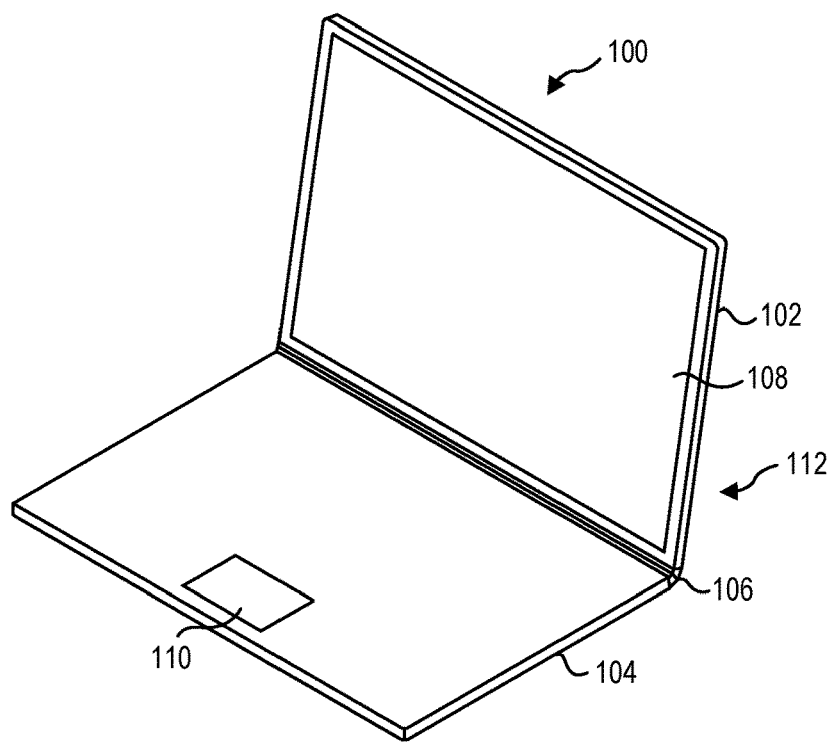
FIG. 1 is a perspective view of a computing device with an input device.

FIG. 1 is a perspective view of an implementation of a computing device 100. The computing device 100 may include a first portion 102 and a second portion 104 movably connected to one another by a hinge 106. In some implementations, the first portion 102 of the computing device 100 may include a display 108 to present visual information to a user and the second portion 104 of the computing device 100 may include one or more input devices 110, such as a trackpad, a keyboard, etc., to allow a user to interact with the computing device 100. In implementations in which the computing device is a hybrid computer, the first portion 102 may include the display 108 and at least a processor 112. The first portion 102 may further include additional computer components, such as a storage device, system memory, a graphical processing unit, graphics memory, one or more communication devices (such as WIFI, BLUETOOTH, near-field communications), peripheral connection points, etc. In some implementations, the first portion 102 may be removable from the hinge 106 and/or the second portion 104.

The input device 110 may include haptic or other tactile feedback. Conventional input devices 110 used in computing devices are used by a user to provide inputs to the computing device 100 while the user looks at display 108. The display 108 can provide visual feedback to the user while using the input device 110, but the user is not looking at the input device 110 during use. In some implementations, the input device 110 can provide haptic feedback to convey to a user information regarding the interaction of the user with the computing device 100. For example, when the user uses the input device 110 to move a cursor over a selectable item on the display 108, the input device 110 may provide haptic communications to the user. In other examples, when the computing device 100 detects an error or otherwise provides urgent information to a user, the input device 110 may provide haptic communications to the user to draw the user's attention.

While the implementation of a computing device 100 illustrated in FIG. 1 is a hybrid laptop device, it should be understood that the present disclosure is relevant to any input device for a computing device 100 or electronic device with which a user may manually interact. Example input devices 110 include trackpads, keyboards, touch-screens, thumbsticks, trackballs, mouses, or other human interface devices. In other examples, haptic feedback devices including one or more of the elements described herein may include buttons, switches, palmrests, device covers, device housings, peripheral connection ports and/or housings, or any other parts of a computing device 100 or electronic device that may provide haptic communications to a user upon interaction. In at least one example, a haptic feedback device may be positioned in a universal serial bus (USB) port to provide a haptic communication to a user upon successful connection of a USB device with the USB port. In some implementations, a computing device 100 may be a wearable device, such as a wrist or head mounted computing device.

Figure 2:
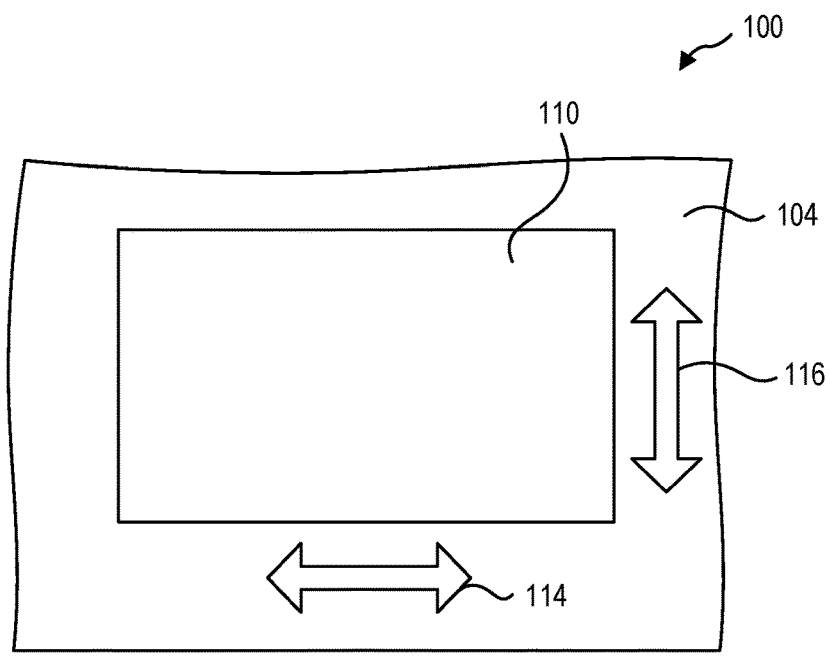
FIG. 2 is a detail top view of the input device of FIG. 1.

FIG. 2 is a top view of the input device 110 of the computing device 100 described in relation to FIG. 1. The input device 110 includes a haptic feedback device that is configured to move a portion of the input device 110 relative to a housing of the computing device 100, such as the second portion 104 of the computing device 100. In some implementations, a portion of the input device 110 (e.g., a surface of the input device 110) is configured to move in an x-direction 114 relative to the housing. In other implementations, a portion of the input device 110 is configured to move in a y-direction 116 relative to the housing. In yet other implementations, a portion of the input device 110 is configured to move in both an x-direction and a y-direction relative to the housing. In further implementations, a portion of the input device 110 is configured to move in a z-direction relative to the housing. In yet further implementations, a portion of the input device 110 is configured to move in at least two of the x-direction, the y-direction, and the z-direction relative to the housing. In at least one implementation, a portion of the input device 110 is configured to move in the x-direction, the y-direction, and the z-direction relative to the housing.

A portion of the input device 110 or other haptic feedback device may move quickly and with a small amplitude to provide the user with a haptic communication. When the haptic communication is of a relatively small magnitude, the user may be unable to perceive a direction of the movement, providing a sensation of movement tactilely while preventing a directional indication that inadvertently communicates undesired information to a user. In some implementations, the haptic communication has an amplitude that is less than 0.5 mm, 0.4 mm, 0.3 mm, 0.2 mm, 0.1 mm, 0.05 mm, 0.025 mm, or any values therebetween. In some examples, it may be critical that the amplitude be less than 200 micrometers. For example, in some implementations, amplitudes above 200 micrometers may provide directional indication which may be undesirable. In some examples, it may be critical that the amplitude be more than 30 micrometers.

In some implementations, the haptic communication has a total duration from a first state (a resting state) to a second state (an actuated state) and back to the first state in a range having an upper value, a lower value, or upper and lower values including any of 25 milliseconds (ms), 30 ms, 35 ms, 40 ms, 45 ms, 50 ms, 60 ms, 70 ms, 80 ms, 90 ms, 100 ms, or any values therebetween. For example, the total duration may be greater than 25 ms. In other examples, the total duration may be less than 100 ms. In yet other examples, the total duration may be between 25 ms and 100 ms. In further examples, the total duration may be less than 50 ms. In yet further examples, the total duration may be less than 40 ms. In at least one example, it may be critical that the total duration may be less than or equal to about 25 ms. For example, in at least one implementation, it may be undesirable to have a total duration that is greater than about 25 ms, as a longer total duration may reduce the effectiveness of the input device 110.

In some implementations, the haptic communication has an actuation duration from the first state to the second state in a range having an upper value, a lower value, or upper and lower values including any of 10 ms, 15 ms, 20 ms, 25 ms, 30 ms, 35 ms, 40 ms, 45 ms, 50 ms, or any values therebetween. For example, the actuation duration may be greater than 10 ms. In other examples, the actuation duration may be less than 50 ms. In yet other examples, the actuation duration may be between 10 ms and 50 ms. In further examples, the actuation duration may be less than 40 ms. In yet further examples, the actuation duration may be less than 30 ms. In at least one example, the actuation duration may be about 25 ms.

In some implementations, the haptic communication has a restoration duration from the second state back to the first state in a range having an upper value, a lower value, or upper and lower values including any of 10 ms, 15 ms, 20 ms, 25 ms, 30 ms, 35 ms, 40 ms, 45 ms, 50 ms, or any values therebetween. For example, the restoration duration may be greater than 10 ms. In other examples, the restoration duration may be less than 50 ms. In yet other examples, the restoration duration may be between 10 ms and 50 ms. In further examples, the restoration duration may be less than 40 ms. In yet further examples, the restoration duration may be less than 30 ms. In at least one example, the restoration duration may be about 25 ms.

The peak velocity of the haptic communication (i.e., the speed of the movement of the haptic feedback device and/or input device relative to a housing) may be in a range having an upper value, a lower value, or upper and lower values including any of 2 micrometers (µm) per millisecond (ms), 4 µm/ms, 6 µm/ms, 8 µm/ms, 10 µm/ms, 12 µm/ms, or any values therebetween. For example, the peak velocity may be greater than 2 µm/ms. In other examples, the peak velocity may be less than 12 µm/ms. In yet other examples, the peak velocity may be between 2 and 12 µm/ms. In further examples, the peak velocity may be between 4 and 10 µm/ms. In at least one example, it may be critical that the peak velocity may be about 8 µm/ms. For example, in at least one implementation, a peak velocity of about 8 µm/ms may provide a better tactile user experience. In some implementations, a short duration and high peak velocity allow for the haptic communication to provide only the sensation of movement without providing a discernable direction to the movement.

Figures 1, 3:
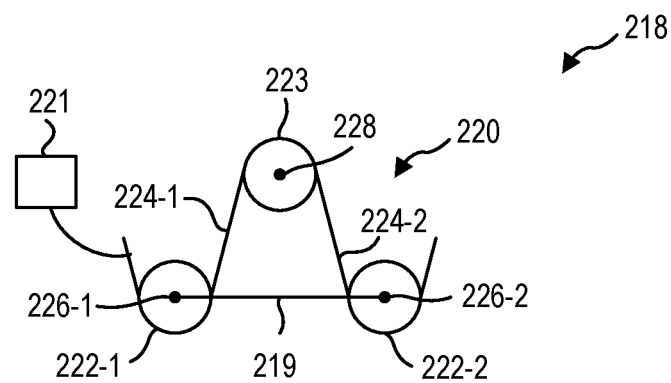
Figures 2, 3:
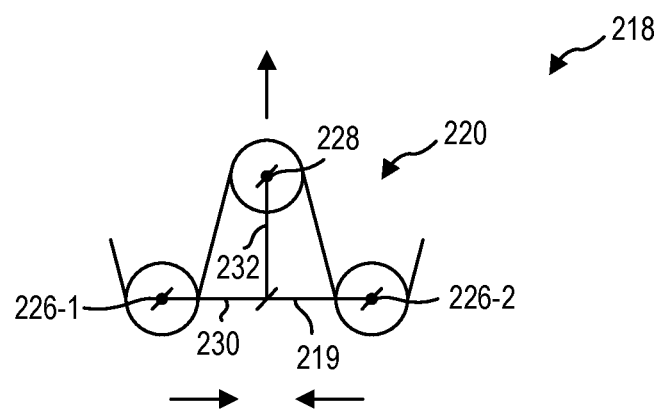

FIG. 3-1 is a detail view of an example haptic feedback device 218. The haptic feedback device 218 includes an electroreactive wire 219 and an electrical input source 221 in communication with the electroreactive wire 219. In some implementations, the electroreactive wire 219 is a shape memory material (SMM), such as a shape memory alloy (SMA) or shape memory polymer (SMP). For example, a SMA includes nickel-titanium alloys. In at least one example, the electroreactive wire 219 includes approximately 50% nickel and 50% titanium by weight.

A spring wire 220 may be arranged into a series of lower coils 222-1, 222-2 and upper coils 223 that are joined by a series of angled segments 224-1, 224-2 therebetween. In other examples, the spring wire 220 may lack lower coils, upper coils, or both, and the angled segments 224-1, 224-2 may be joined by curves or corners in the spring wire 220.

In some implementations, the lower coils 222-1, 222-2 have lower centerpoints 226-1, 226-2, respectively, and the upper coils 223 have upper centerpoints 228. The contraction of the electroreactive wire 219, and resultant movement of the spring wire 220, in response to an electrical input from the electrical input source 221 may be described in terms of the relative movement of the lower centerpoints 226-1, 226-2 and upper centerpoints 228.

FIG. 3-2 illustrates the haptic feedback device 218 of FIG. 3-1 upon application of an electric input. The material of the electroreactive wire 219, such as a SMM, may change from a first state to a second state upon application of the electric input. When the microstructure of the electroreactive wire 219 changes, the macrostructure can change, as well. The macro movement of the electroreactive wire 219 produces a movement in the relative positions of the first lower centerpoint 226-1 and the second lower centerpoint 226-2 of the electroreactive wire 219, compressing the spring wire 220 in the x-direction. The x-spacing 230 of the first lower centerpoint 226-1 and the second lower centerpoint 226-2 decreases, pulling the first lower centerpoint 226-1 and the second lower centerpoint 226-2 toward one another while the y-spacing 232 of upper centerpoint 228 orthogonal to the x-spacing 230 increases.

Upon removal of the electrical input, the spring wire 220 can generate a restorative force and push first lower centerpoint 226-1 and the second lower centerpoint 226-2 apart, and the electroreactive wire 219 can return to the first state. The increase in the x-spacing 230 correlates to a decrease in the y-spacing 232 as the upper centerpoint 228 moves downward toward the first lower centerpoint 226-1 and the second lower centerpoint 226-2. Through sequential application and removal of electrical inputs, the electroreactive wire 219 may cycle between the first state and the second state, oscillating the x-spacing 230 and y-spacing 232 of the haptic feedback device 218.

Figure 4:
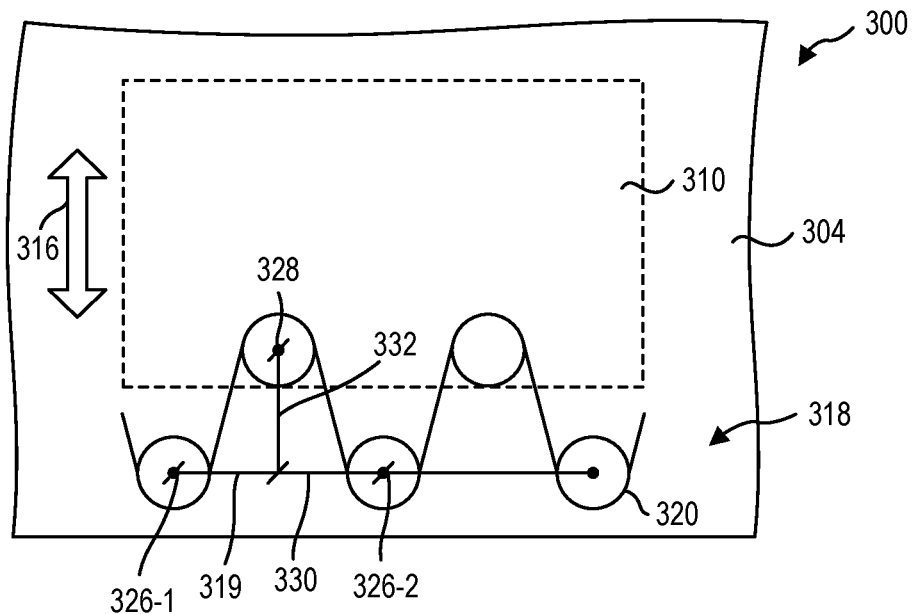
FIG. 4 is a top cutaway view of a haptic input device.

FIG. 4 is an example implementation of a haptic feedback device 318 positioned in a computing device 300. The haptic feedback device 318 is positioned with the spring wire 320 straddling between a haptic surface and a mechanical ground. In the illustrated implementation, the haptic surface is an input device 310 (i.e., a trackpad) and the mechanical ground is the housing of the second portion 304 of the computing device 300. The series of lower centerpoints 326-1, 326-2 are positioned in the housing and the upper centerpoints 328 are positioned in the input device 310. For example, the first lower centerpoint 326-1 and the second lower centerpoint 326-2 are positioned in the housing, and when the electroreactive wire 319 changes from the first state to the second state, the x-spacing 330 decreases and the spring wire 320 increases the y-spacing 332. As the lower centerpoints 326-1, 326-2 are in the housing, there is no net movement of the haptic surface in the x-direction, however, the upper centerpoint 328 is positioned in the input device 310, causing a net movement in the y-direction 316 of the input device 310 relative to the housing of the second portion 304.

Figure 5:
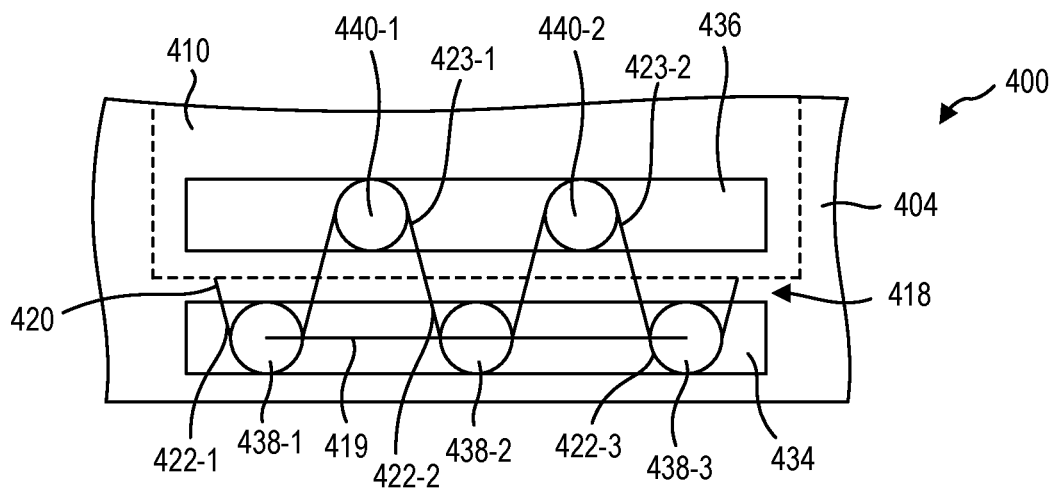
FIG. 5 is a top cutaway view of another haptic input device.

To allow the y-spacing 332 to change, the x-spacing 330 must be able to change. The lower centerpoints 326-1, 326-2 may, therefore, be able to move in the x-direction while being restricted to movement in the x-direction. FIG. 5 illustrates an implementation of a haptic feedback device 418 in which each of the series of lower coils 422-1, 422-2, 422-3 and the series of upper coils 423-1, 423-2 are connected to a lower channel 434 and an upper channel 436, respectively. The lower channel 434 and upper channel 436 may each retain at least one lower post 438-1, 438-2, 438-3 and at least one upper post 440-1, 440-2, respectively.

For example, a first lower post 438-1 is slidable in an x-direction within the lower channel 434. The first lower coil 422-1 is positioned around the first lower post 438-1 to connect the first lower coil 422-1 to the lower channel 434 of the housing of the second portion 404 of the computing device 400. A first upper post 440-1 is slidable in the x-direction within the upper channel 436. The first upper coil 423-1 is positioned around the first upper post 440-1 to connect the first upper coil 423-1 to the upper channel 436 of the input device 410.

With the first upper coil 423-1 positioned around the first upper post 440-1 and the second upper coil 423-2 positioned around the second upper post 440-2, the upper coils 423-1, 423-2 are allowed to move in the x-direction relative to the haptic surface of the input device 410 while being fixed in the y-direction relative to the haptic surface. With the first lower coil 422-1 positioned around the first lower post 438-1, the second lower coil 422-2 positioned around the second lower post 438-2, and the third lower coil 422-3 positioned around the third lower post 438-3, the lower coils 422-1, 422-2, 422-3 are allowed to move in the x-direction relative to the housing of the second portion 404 of the computing device 400 while being fixed in the y-direction relative to the housing. As described in relation to FIG. 3-2, when the lower coils 422-1, 422-2, 422-3 and/or the upper coils 423-1, 423-2 move toward one another in the x-direction, the haptic feedback device 418 applies a net force in the y-direction. The lower posts 438-1, 438-2, 438-3 and the upper posts 440-1, 440-2 move in the y-direction and urge upper channel 436 connected to the haptic surface to move in the y-direction.

In some implementations, a heat sink may be positioned adjacent the electroreactive wire 419 to cool to the electroreactive wire 419. The force, displacement, velocity, or combinations thereof generated by the electroreactive wire 419 when a current is applied may decrease as the electroreactive wire 419 warms. Cooling the electroreactive wire 419 with a heat sink increases the firing rate (frequency of actuation) and increases the performance of the electroreactive wire 419 during repeated actuation. For example, one or more of the posts may be a heat sink that absorbs heat from the electroreactive wire 419. In other examples, the heat sink may be configured to absorb heat from and to cool the lower posts 438-1, 438-2, 438-3 and/or upper posts 440-1, 440-2 to indirectly cool the electroreactive wire 419. In at least one example, the heat sink may include copper. In at least another example, the heat sink may include silicone.

It should be understood that while the implementations illustrated in FIG. 4 and FIG. 5 have three lower coils and two upper coils, a haptic feedback device may have any number or arrangement of connection points along a lower channel (or other lower row of connection points) and along an upper channel (or other upper row of connection points). For example, the spring wire of the haptic feedback device may include an odd number of upper coils or an even number of upper coils. The spring wire may include an odd number of lower coils or an even number of lower coils. As described herein, the spring wire may have bends or curves instead of coils. For example, the spring wire may have an odd number of upper curves or an even number of upper curves. The spring wire may include an odd number of lower curves or an even number of lower curves.

Referring again to FIG. 5, the haptic feedback device 418 may allow the spring wire 420 to move in the x-direction freely. In some implementations, at least one point along the spring wire 420 may be fixed in the x-direction, such that spring wire 420 expands and/or contracts in the x-direction relative to that point. For example, the first lower post 438-1 may be fixed relative to the lower channel 434. The second lower post 438-2 and third lower post 438-3 may then slide within the lower channel 434 when the electroreactive wire 419 moves from the first state to the second state and from the second state to the first state. In such an example, the third lower post 438-3 moves more than the second lower post 438-2 as the displacement between each lower post changes by approximately the same amount. In other implementations, a lower post in the approximate center of the lower channel 434 is fixed to the lower channel 434, such as fixing the second lower post 438-2 to the lower channel 434. In such an example, the lower posts on either side (i.e., the first lower post 438-1 and the third lower post 438-3) of the fixed lower post (i.e., the second lower post 438-2) move toward the fixed lower post, decreasing the maximum displacement of any one of the lower posts (and/or upper posts) during movement of the spring wire 420.

Figure 6:
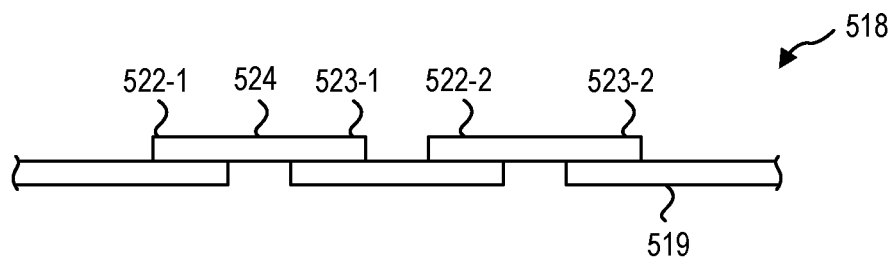
FIG. 6 is a side view of a spring wire.
Figure 7:
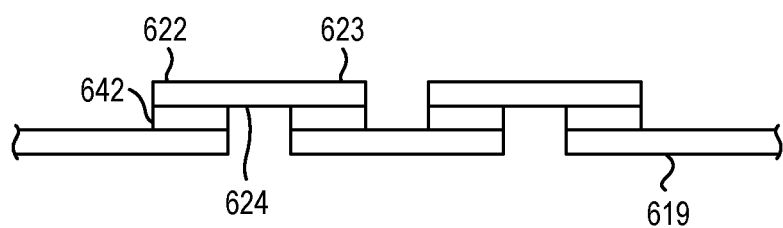
FIG. 7 is a side view of another spring wire.
Figure 8:
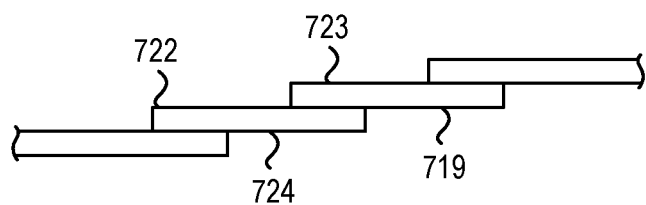
FIG. 8 is a side view of yet another spring wire.

FIG. 6 through FIG. 8 illustrate implementations of spring wires in different arrangements. In some implementations, a spring wire 520 may be configured to minimize the size of the haptic feedback device 518 in the z-direction (the vertical direction in the side view presented in FIG. 6). For example, the spring wire 520 may have a series of lower coils 522-1, 522-2 and upper coils 523-1, 523-2 that alternate in winding direction. By alternating in winding direction, the segments 524 between the lower coils 522-1, 522-2 and upper coils 523-1, 523-2 are aligned with the x-direction.

The segments 524 may also alternate between z-positions between coils. For example, the segment between the first lower coil 522-1 and the first upper coil 523-1 is parallel to the x-direction at a greater z-position than the segment 524 between the first upper coil 523-1 and the second lower coil 522-2, which is also parallel to the x-direction but at a lower z-position. This offset may limit and/or prevent binding of the spring wire during movement of the electroreactive wire from the first state to the second state and back. This may also limit the z-direction dimension of the spring wire 520 to aid in packaging the haptic feedback device 518 in small spaces.

FIG. 7 illustrates another implementation of a spring wire 620 with a greater dimension in the z-direction to increase the offset between segments 624. In some implementations, at least one of the lower coils 622 and/or upper coils 623 includes a plurality of wraps 642. For example and in contrast to FIG. 6, the lower coil 622 includes an additional, intermediate wrap 642 and the upper coil 623 includes an additional wrap 642. Therefore, the segments 624 between the lower coils 622 and upper coils 623 remain parallel, but offset by a greater amount. The additional wraps may increase the force and/or displacement of the spring wire 620 during movement of the electroreactive wire from the first state to the second state.

FIG. 8 illustrates yet another implementation of a spring wire 720 with lower coils 722 and upper coils 723 that have the same winding direction. The segments 724 between the lower coils 722 and upper coils 723, therefore, are oriented at an angle to the x-direction to keep the overall spring wire 720 flat. Using the same winding direction for all the coils may simplify manufacturing and reduce costs.

While FIG. 6 though FIG. 8 illustrate different implementations of spring wires, it should be understood that different wire arrangements may be used in combination with one another to change the behavior of the haptic feedback device. For example, the number of wraps to a coil may vary across a length of the spring wire to change the haptic communication amplitude and/or velocity across a width of the haptic surface. In other examples, a length and/or angle of the segments may change across a length of the spring wire to change the haptic communication amplitude and/or velocity across a width of the haptic surface. In at least one implementation, a haptic feedback device including a spring wire as described herein may allow haptic feedback in electronic or computing devices with smaller form factors and tighter packaging of components.

One or more specific implementations of the present disclosure are described herein. These described implementations are examples of the presently disclosed techniques. Additionally, in an effort to provide a concise description of these implementations, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A haptic feedback device, comprising:
   a mechanical ground;
   a haptic surface;
   a plurality of connection points connected to the mechanical ground;
   a plurality of connection points connected to the haptic surface;
   a spring wire extending around the plurality of connection points connected to the mechanical ground and the plurality of connection points connected to the haptic surface; and
   an electroreactive wire configured to contract the plurality of connection points connected to the mechanical ground or the plurality of connection points connected to the haptic surface.

2. The haptic feedback device of claim 1, the haptic surface being a touch-sensing device.

3. The haptic feedback device of claim 1, at least one connection point of the plurality of connection points connected to the haptic surface being fixed in a first direction and free to move in a second direction.

4. The haptic feedback device of claim 1, at least one connection point of the plurality of connection points connected to the mechanical ground being fixed in a first direction and free to move in a second direction.

5. The haptic feedback device of claim 4, at least one of the connection points of the plurality of connection points connected to the mechanical ground being fixed relative to the mechanical ground.

6. The haptic feedback device of claim 5, the at least one of the connection points of the plurality of connection points connected to the mechanical ground fixed relative to the mechanical ground being in a center of the plurality of connection points connected to the mechanical ground.

7. The haptic feedback device of claim 1, the electroreactive wire including a shape memory alloy.

8. The haptic feedback device of claim 1 further comprising a first channel connected to the haptic surface and a second channel connected to the mechanical ground, the plurality of connection points connected to the haptic surface being movable within the first channel and at least one of the plurality of connection points connected to the mechanical ground being moveable within the second channel.

9. An electronic device, comprising:
a housing;
a haptic surface;
a first channel connected to the housing with a first plurality of connection points slidably connected to the first channel in a first direction;
a second channel connected to the haptic surface with a second plurality of connection points connected to the haptic surface; and
a spring wire connected to the first plurality of connection points and the second plurality of connection points such that a contraction of the spring wire in a first direction displaces the first channel and second channel in a second direction.

10. The electronic device of claim 9, the haptic surface being a trackpad.

11. The electronic device of claim 9, the second plurality of connection points having at least one connection point fixed to the second channel.

12. The electronic device of claim 9, the first plurality of connection points having at least one connection point fixed to the first channel.

13. The electronic device of claim 9, the spring wire having a plurality of lower coils and a plurality of upper coils with a plurality of segments positioned therebetween.

14. The electronic device of claim 13, the plurality of lower coils and the plurality of upper coils having alternating winding directions.

15. The electronic device of claim 13, at least one lower coil of the plurality of lower coils or at least one upper coil of the plurality of upper coils having an intermediate wrap.

16. The electronic device of claim 13, the segments of the plurality of segments all being oriented at a same angle relative to the first direction.

17. The electronic device of claim 9, further comprising an electrical input source in communication with an electroreactive wire.

18. An electronic device, comprising:
a mechanical ground;
a haptic surface;
a first channel connected to the mechanical ground with a first plurality of connection points connected to the first channel in a first direction;
a second channel connected to the haptic surface with a second plurality of connection points connected to the haptic surface;
a spring wire connecting the first plurality of connection points and second plurality of connection points;
an electroreactive wire connected to the first plurality of connection points or the second plurality of connection points and the electroreactive wire having a first state and a second state, the electroreactive wire being movable between the first state and the second state to move the first plurality of connection points and second plurality of connection points in a first direction causing the spring wire to move the first plurality of connection points and second plurality of connection points relative to one another in a second direction such that the haptic surface moves in the second direction relative to the mechanical ground; and
an electrical input source configured to apply an electrical input to the electroreactive wire to move the electroreactive wire from the first state to the second state in less than 25 milliseconds (ms).

19. The electronic device of claim 18, the spring wire being configured to restore the electroreactive wire to the first state upon removal of the electrical input in less than 25 ms.

20. The electronic device of claim 18, further comprising a heat sink adjacent the electroreactive wire to cool the electroreactive wire and increase a firing rate.

* * * * *